3,019,257
METHOD OF PREPARING 3-ALKOXY-4-HY-
DROXYBENZOIC ACIDS AND DIALKYL-
AMIDES THEREOF
Luigi Canonica, Milan, Italy, assignor to Istituto
Biochimico Italiano, Milan, Italy
No Drawing. Filed Sept. 25, 1957, Ser. No. 686,033
4 Claims. (Cl. 260—520)

For some fifty years considerable research has been carried out for preparing dialkylamides of arylcarboxylic acids because of the stimulating effect of the diethylamide of benzoic acid on analeptic properties shown by some of such substances.

Starting from the old observations of Nebelthau (Arch. Exper. Path. u. Pharm. 452 (1895)) on the breathing and blood circulation, Harras (Arch. Ing. Pharm. u. Ther. 11, 443 (1903)), proved by experiments on the diethylamides of salicylic, anisic and veratric acids that the introduction of substituents into the nucleus of the diethylamide of benzoic acid can substantially improve the analeptic action.

Such increase in the pharmacological activity is particularly remarkable in the diethylamide of vanillic acid (Kratzl and Kvasnicka, Monatsch. 83, 18 (1952); Austrian patent specification No. 168,059), of isovanillic acid (F. Caujolle et Coll. Lyon Pharmaceutique 157 (1956)) and of 3-ethoxy-4-hydroxybenzoic acid (Austrian patent specification No. 168,059: L. Canonica e Coll. Ann. Chim. 45, 205 (1955)), all of which have a better analeptic action than that of any other known synthetic product.

The 3-alkoxy-4-hydroxybenzoic acids and the dialkylamides thereof having the Formulas I and II

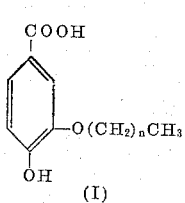

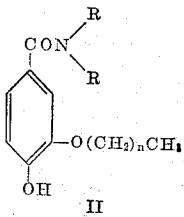

in which $n = 0, 1, 2, 3 \ldots 10$ and
$R = -CH_3, -C_2H_5, -C_3H_7, -C_4H_9,$
and $-CH_2-CH=CH_2$ have been prepared by a method starting from an ester of protocatecuic acid. The method involves benzylation of the hydroxyl group in position 4 and thereafter alkylation of the hydroxyl group in position 3. This results in a 3-alkoxy-4-benzyloxybenzoic acid having in position 3 a methoxy, ethoxy or other alkoxy group having a greater number of carbon atoms (from 3 up to 10).

After alkaline or acid hydrolysis of the ester, the resulting free acid is converted to a dialkylamide of 3-alkoxy-4-hydroxybenzoic acid by one of the following methods:

(a) The 3-alkoxy-4-benzyloxybenzoic acid is submitted to catalytic hydrogenation. The benzyl group is thus eliminated and a 3-alkoxy-4-hydroxybenzoic acid is formed which, with the hydroxyl group free or acylated, is converted to the dialkylamide, by treating the corresponding chloride with a dialkylamine. If this last-mentioned reaction is carried out with the 4-hydroxyl group acylated, the acyl group may be eliminated and the hydroxyl group regenerated by hydrolysis either by means of alkali metal hydroxides or carbonates or by ammonia or amines with heating.

(b) The 3-alkoxy-4-benzyloxybenzoic acid is converted to the dialkylamide by treating the corresponding chloride with a dialkylamine; debenzylation by catalytic hydrogenation is then effected and the result is the dialkylamide of the 3-alkoxy-4-hydroxybenzoic acid.

Example I 168 g. of methyl-3,4-dioxybenzoate dissolved in 500 cc. of methylethylketone are refluxed for six hours with 138 g. of benzyl-chloride in the presence of 151 g. of anhydrous potassium carbonate. After elimination of the salts by filtering and of the solvent by distillation, the residue is a viscous mass which, crystallized from water, has a melting point of 127–128°. The yield of methyl 3-hydroxy-4-benzyloxybenzoate is 200 g.

Example II 258 g. of methyl 3-hydroxy-4-benzyloxybenzoate dissolved in 1600 cc. of methyl alcohol containing 58 g. of potassium hydrate are refluxed with 110 g. of ethyl bromide for five hours. After filtering 3-ethoxy-4-benzyloxybenzoic acid is obtained by acid or alkaline hydrolysis. The yield is 245 g.

Example III 258 g. of methyl 3-hydroxy-4-benzyloxybenzoate dissolved in 1000 cc. of methylethylketone are refluxed for six hours with 109 g. of ethyl bromide in the presence of 165 g. of anhydrous potassium carbonate. After filtering the salts and eliminating the solvent, 3-ethoxy-4-benzyloxybenzoic acid is obtained by acid or alkaline hydrolysis. Yield: 245 g.

Example IV 23 g. of metallic sodium in small pieces are dispersed in 1.5 liters of anhydrous toluene and 100 g. of absolute ethanol are added; 258 g. of the methyl-3-hydroxy-4-benzyloxybenzoate are introduced in portions and then the excess alcohol is distilled. Finally 123 g. of isopropyl bromide are added and the mass is refluxed for five hours. The salts are filtered, the solvent is eliminated and after acid or alkaline hydrolysis, 3-isopropoxy-4-benzyloxybenzoic acid having a melting point of 160° is obtained. The yield is 225 g.

Example V 272 g. of 3-ethoxy-4-benzyloxybenzoic acid dissolved in 1500 cc. of 98% methyl alcohol are submitted to catalytic hydrogenation at room temperature and pressure in the presence of 15 g. of 5% carbon palladiate. After filtering the catalyst and eliminating the solvent by distillation, 3-ethoxy-4-hydroxybenzoic acid having a melting point of 164–165° is obtained. The yield is 175 g.

Example VI 181 g. of 3-ethoxy-4-hydroxybenzoic acid are dissolved in 1 liter of sodium hydroxide and added in portions to 138 g. of freshly distilled acetic anhydride. After some time, 3-ethoxy-4-acetoxybenzoic acid is precipitated. Melting point 148–150°. The yield is 220 g.

Example VII 224 g. of very dry 3-ethoxy-4-acetoxybenzoic acid are refluxed for two hours with 237.8 g. of thionyl chloride; at the end of the reaction the excess thionyl chloride is eliminated under vacuum, the residue being extracted several times with benzene to complete said elimination. The residue is dissolved in 2420 g. of anhydrous benzene, and 160.6 g. of diethylamine is added to the solution with agitation and cooling. Diethylamine hydrochloride is precipitated and filtered off, and the benzene solution containing the diethylamide of 3-ethoxy-4-acetoxybenzoic acid is concentrated partly under normal pressure and parly under vacuum so that it is purified by distillation. Boiling point: 186–188° at 7 mm. The yield is 188 g.

*Example VIII*

224 g. of 3-ethoxy-4-hydroxybenzoic acid are dissolved in 300 cc. of anhydrous benzene and then refluxed for two hours with 237.8 g. of thionyl chloride. The excess of the latter is eliminated at the end of the reacion as described in the preceding example and the residue is dissolved in 2420 cc. of anhydrous benzene: diethylamine is added (160.6 g.) in portions and then the mass is refluxed for an hour. The solid products formed are filtered and then the benzene is eliminated partly under atmospheric pressure and partly under vacuum. The residue which consists mainly of the diethylamide of 3-ethoxy-4-hydroxybenzoic acid is crystallized from petroleum ether. The yield is 120 g. of product having a melting point of 92.5°.

*Example IX*

279 g. of the diethylamide of 3-ethoxy-4-acetoxybenzoic acid are agitated in the cold with 1500 of 3.5% ammonia until completely dissolved: after decoloration with adsorbent carbon, the diethylamide of 3-ethoxy-4-hydroxybenzoic acid is precipitated by the action of dilute acid. The yield is 205 g. of the pure product having a melting point of 92.5°.

*Example X*

272 g. of very dry 3-ethoxy-4-benzyloxybenzoic acid are refluxed for two hours with 237.8 g. of thionyl chloride; at the end of the reaction the excess thionyl chloride is eliminated under vacuum, the residue is then treated with 3040 g. of anhydrous benzene, and 160.6 g. of diethylamine are added to the resulting solution with agitation and cooling. The separated diethylamine hydrochloride is filtered off, and the benzene solution containing the diethylamide of 3-ethoxy-4-benzyloxybenzoic acid is concentrated partly under normal pressure and partly under vacuum and the resulting crude product is purified by crystallization. The yield is 275 g. of the pure product.

*Example XI*

327 g. of the diethylamide of 3-ethoxy-4-benzyloxybenzoic acid dissolved in 1000 cc. of 98% methyl alcohol are hydrogenated at room temperature and pressure in the presence of 15 g. of 5% carbon pallidiate. After filtering the catalyst and eliminating the solvent by distillation there results the diethylamide of 3 - ethoxy- 4 - hydroxybenzoic acid which is purified by crystallization. The yield is 200 g.

What is claimed as new and desired to be secured by Letters Patent is:

1. A method of preparing a compound having the formula

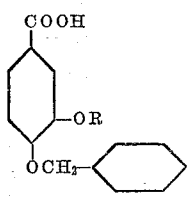

wherein R is alkyl of from 1–10 carbon atoms, comprising reacting an alkyl ester of 3,4-dihydroxy-benzoic acid with a benzyl halide to form an alkyl ester of 3-hydroxy-4-benzyloxy-benzoic acid, reacting said last-mentioned 4-benzyloxy compound with an alkyl halide of from 1–10 carbon atoms to form the corresponding alkyl ester of a 3-alkoxy-4-benzyloxybenzoic acid, and hydrolyzing said last-mentioned ester to form the free acid.

2. A method of preparing a compound having the formula

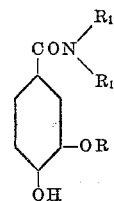

wherein R is alkyl of from 1–10 carbon atoms and $R_1$ is alkyl of from 1–4 carbon atoms, which process comprises reacting an alkyl ester of 3,4-dihydroxy-benzoic acid with a benzyl halide to form an alkyl ester of 3-hydroxy-4-benzyloxy-benzoic acid, reacting said last-mentioned 4-benzyloxy compound with an alkyl halide of from 1–10 carbon atoms to form the corresponding alkyl ester of a 3-alkoxy-4-benzyloxy-benzoic acid, hydrolyzing said last-mentioned ester to form the free acid, catalytically hydrogenating the resulting 3-alkoxy-4-benzyloxy-benzoic acid to form the corresponding 3-alkoxy-4-hydroxy-benzoic acid, reacting said 3-alkoxy-4-hydroxy-benzoic acid with thionyl chloride to form the corresponding acid halide and finally reacting said acid halide with a dialkylamine, the alkyls of which are of 1–4 carbon atoms.

3. A method of preparing a compound having the formula

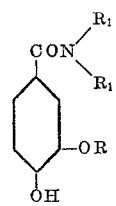

wherein R is alkyl of from 1–10 carbon atoms and $R_1$ is alkyl of from 1–4 carbon atoms, which process comprises reacting an alkyl ester of 3,4-dihydroxy-benzoic acid with a benzyl halide to form an alkyl ester of 3-hydroxy-4-benzyloxy-benzoic acid, reacting said last-mentioned 4-benzyloxy compound with an alkyl halide of from 1–10 carbon atoms to form the corresponding alkyl ester of a 3-alkoxy-4-benzyloxy-benzoic acid, hydrolyzing said last-mentioned ester to form the free acid, catalytically hydrogenating the resulting 3-alkoxy-4-benzyloxy-benzoic acid to form the corresponding 3-alkoxy-4-hydroxy-benzoic acid, reacting said 3-alkoxy-4-hydroxy-benzoic acid with a lower alkanoic acid anhydride to produce a 3-alkoxy-4-acyloxy-benzoic acid, reacting said 3-alkoxy-4-acyloxy-benzoic acid with thionyl chloride to form the corresponding acid halide, reacting said acid halide with a dialkylamine, the alkyls of which are of 1–4 carbon atoms to form the corresponding dialkylamide of a 3-alkoxy-4-acyloxy-benzoic acid, and finally hydrolyzing said last-mentioned 4-acyloxy compound to regenerate the 4-hydroxy group.

4. A method of preparing a compound having the formula

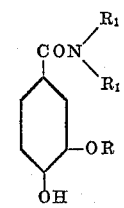

wherein R is alkyl of from 1–10 carbon atoms and $R_1$ is alkyl of from 1–4 carbon atoms, which process comprises reacting an alkyl ester of 3,4-dihydroxy-benzoic acid with a benzyl halide to form an alkyl ester of 3-hydroxy-4-benzyloxy-benzoic acid, reacting said last-mentioned 4-benzyloxy compound with an alkyl halide of from 1–10 carbon atoms to form the corresponding alkyl ester of a 3-alkoxy-4-benzyloxy-benzoic acid, hydrolyzing said last-mentioned ester to form the free acid, converting the resulting 3-alkoxy-4-benzyloxy-benzoic acid to the corresponding acid halide, reacting said acid halide with a dialkylamine, the alkyl radicals of which are of 1–4 carbon atoms to form the corresponding dialkylamide of the 3-alkoxy, 4-benzyloxy-benzoic acid and finally catalytically hydrogenating said dialkylamide to form said first-mentioned compound.

References Cited in the file of this patent

Houben: Die Methoden der Org. Chem., 3rd ed., vol. 3, pages 139, 151, 179–180 (1943).

Mullaji et al.: Chemical Abstracts, vol. 46, column 11191 (1952).

Kametani: Chemical Abstracts, vol. 47, column 10536–7 (1953).

Wagner et al.: Synthetic Organic Chemistry, pages 172, 226–228, 416, 417, 546, 547, 566 and 567 (1953).